(12) United States Patent
Hiscock et al.

(10) Patent No.: US 10,393,857 B2
(45) Date of Patent: Aug. 27, 2019

(54) METHODS AND SYSTEMS FOR MEASURING ANGLE OF ARRIVAL OF SIGNALS TRANSMITTED BETWEEN DEVICES

(71) Applicant: QUALCOMM Incorporated, San Diego, CA (US)

(72) Inventors: Paul Hiscock, Cambridge (GB); Sandeep KesiReddy, San Diego, CA (US); Mauro Scagnol, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 15/486,063

(22) Filed: Apr. 12, 2017

(65) Prior Publication Data
US 2018/0299531 A1   Oct. 18, 2018

(51) Int. Cl.
| G01S 5/10 | (2006.01) |
| H04L 5/00 | (2006.01) |
| G01S 3/48 | (2006.01) |
| G01S 3/46 | (2006.01) |
| G01S 5/02 | (2010.01) |
| H04W 64/00 | (2009.01) |
| G01S 3/04 | (2006.01) |
| H04W 4/80 | (2018.01) |

(52) U.S. Cl.
CPC ............ *G01S 5/10* (2013.01); *G01S 3/043* (2013.01); *G01S 3/465* (2013.01); *G01S 3/48* (2013.01); *G01S 5/0236* (2013.01); *H04L 5/0044* (2013.01); *H04W 64/00* (2013.01); *H04W 4/80* (2018.02)

(58) Field of Classification Search
CPC . G01S 5/10; G01S 5/0236; G01S 3/48; G01S 3/465; G01S 3/043; H04L 5/0044; H04W 64/00; H04W 4/80
See application file for complete search history.

(56) References Cited

U.S. PATENT DOCUMENTS

| 4,809,012 A * | 2/1989 | Tong ........................ G01S 3/48 342/442 |
| 2006/0119514 A1* | 6/2006 | Pritchard ............... G01S 3/043 342/418 |
| 2011/0074633 A1* | 3/2011 | Pun ........................ G01S 3/043 342/442 |

(Continued)

FOREIGN PATENT DOCUMENTS

WO   WO-2016030571 A1   3/2016

OTHER PUBLICATIONS

International Search Report and Written Opinion—PCT/US2018/026648—ISA/EPO—dated Jul. 5, 2018.

(Continued)

*Primary Examiner* — Jianye Wu
(74) *Attorney, Agent, or Firm* — Hunter Clark PLLC

(57) ABSTRACT

Disclosed are systems, devices and methods for determining an angle of arrival (AoA) of a signal transmitted between devices. Particular implementations enable obtaining measurements of AoA from signals that are not pure tone signals. In one aspect, a reference signal may emulate one or more aspects of a packet signal as transmitted by a transmitter. An AoA of the packet signal may be determined based, at least in part, on the packet signal and the reference signal.

27 Claims, 6 Drawing Sheets

(56) References Cited

U.S. PATENT DOCUMENTS

2012/0120834 A1    5/2012  Sugar et al.
2012/0178471 A1*   7/2012  Kainulainen ......... G01S 5/0009
                                                      455/456.1
2014/0210665 A1    7/2014  Desai et al.
2016/0234649 A1    8/2016  Finnerty et al.

OTHER PUBLICATIONS

<Span style="font-family: calibri;">Madhavapeddy A., et al., "A Study of Bluetooth Propagation Using Accurate Indoor Location Mapping", Proceedings of the 7th International Conference on Ubiquitous Computing, vol. 3660, Sep. 2005, pp. 105-122.

* cited by examiner

METHODS AND SYSTEMS FOR MEASURING ANGLE OF ARRIVAL OF SIGNALS TRANSMITTED BETWEEN DEVICES

BACKGROUND

Field

Embodiments described herein are directed to obtaining measurements of signals acquired from a transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, an angle of arrival (AoA) of a signal received at a device may be used to estimate a location or an orientation of the device.

SUMMARY

Briefly, one particular implementation is directed to a method, at a receiving device, comprising: receiving, at multiple antennas, at least a first portion of a first packet signal transmitted from a transmitter to provide a processed packet signal; obtaining a reference signal emulating one or more aspects of the first packet signal as transmitted by the transmitter based, at least in part, on a received wireless signal transmitted from the transmitter; and estimating an angle of arrival of the first packet signal based, at least in part, on the processed packet signal and the reference signal.

Another particular implementation is directed to a receiving device, comprising: a plurality of antennas; and a processor configured to: process at least a first portion of a first packet signal received at the plurality of antennas and transmitted from a transmitter to provide a processed packet signal; obtain a reference signal emulating one or more aspects of the first packet signal as transmitted by the transmitter based, at least in part, on a received wireless signal transmitted from the transmitter; and estimate an angle of arrival of the first packet signal based, at least in part, on the processed packet signal and the reference signal.

Another particular implementation is directed to a storage medium comprising computer-readable instructions stored thereon which are executable by one or more processors at a receiving device to: obtain at least a first portion of a first packet signal received at multiple antennas, at least a first portion of a first packet signal transmitted from a transmitter, to provide a processed packet signal; obtain a reference signal emulating one or more aspects of the first packet signal as transmitted by the transmitter based, at least in part, on a received wireless signal transmitted from the transmitter; and estimate an angle of arrival of the first packet signal based, at least in part on the processed packet signal and the reference signal.

Another particular implementation is directed to a receiving device, comprising: means for receiving, at multiple antennas, at least a first portion of a first packet signal transmitted from a transmitter to provide a processed packet signal; means for obtaining a reference signal emulating one or more aspects of the first packet signal as transmitted by the transmitter based, at least in part, on a received wireless signal transmitted from the transmitter; and means for estimating an angle of arrival of the first packet signal based, at least in part, on the processed packet signal and the reference signal.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
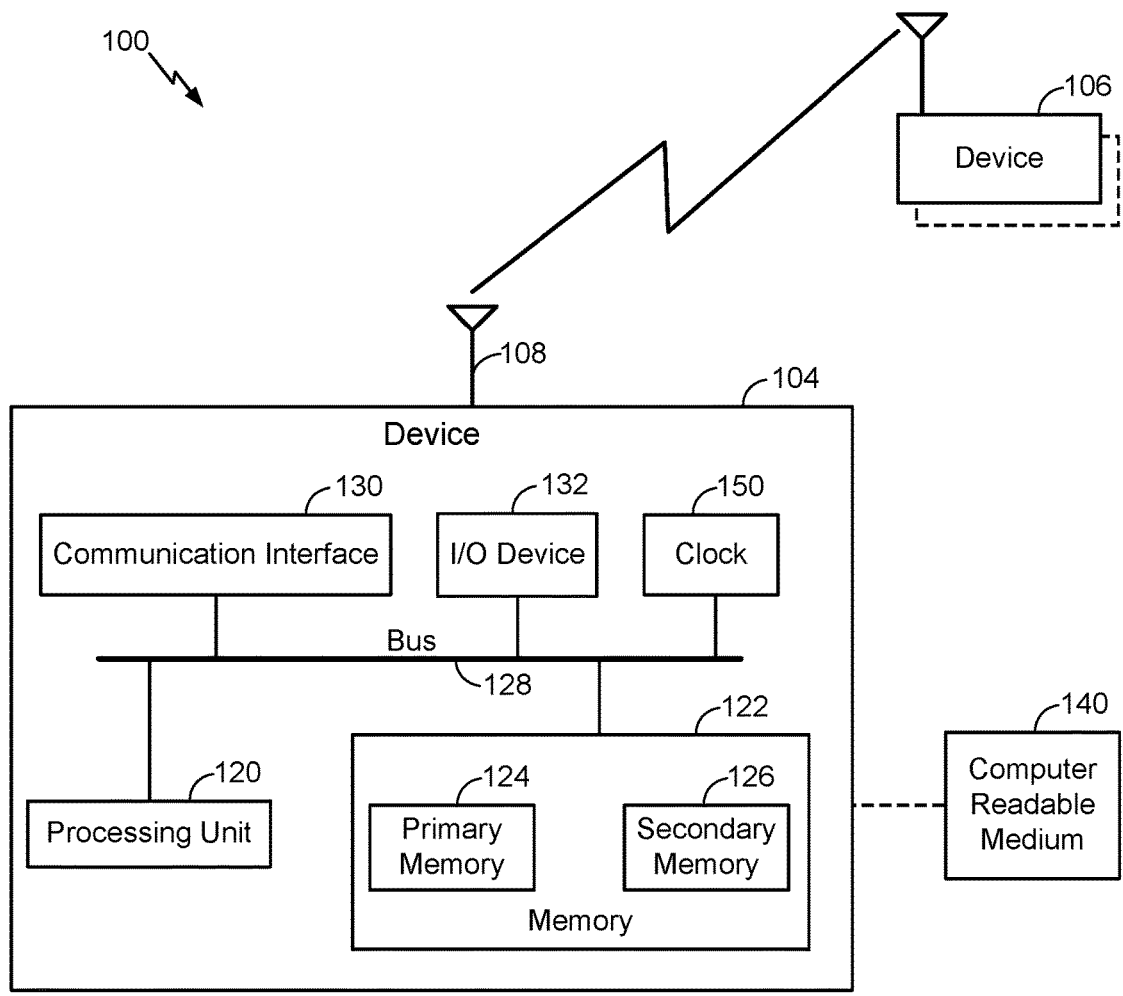
FIG. 1 is a schematic block diagram of an example computing system in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

The global positioning system (GPS) and other like satellite positioning systems have enabled navigation services for mobile handsets in outdoor environments. Since satellite signals may not be reliably received and/or acquired in an indoor environment, different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from signals received from such access points and measuring one or more characteristics of signals received from such access points such as, for example, received signal strength indicator (RSSI), round trip delay (RTT), just to name a few examples.

Use of RTT and RSSI measurements in positioning for indoor environments is very inaccurate in band limited systems such as Bluetooth®. With RTT based positioning in particular, this is in part because narrow bandwidth may involve a blurring of multipath components. It is also because accuracy typically depends on determination of precise times of reception and departure in the presence of drifting clocks and complex receive chains.

Aspects of the latest Bluetooth® (BT) protocol for determination of angle of arrival (AoA) and/or a range between devices may be based, at least in part, on measurements of tone signals transmitted between devices. Devices employing features of future versions of the BT protocol may measure or estimate an AoA of a tone signal transmitted from a transmitter that is received by multiple antennas at a receiver. This feature, however, may not be available for processing of signals transmitted using legacy BT devices employing earlier versions of the BT protocol, such as BT devices incorporating features of Bluetooth Specification, version 4.2, December 2014 (hereinafter "BT version 4.2") without additional enhancements/features of future versions of the BT protocol. Also, a tone signal transmitted from such a legacy BT device employing an earlier version of the BT protocol may be easy to reconstruct, raising significant security issues for certain automotive applications.

According to an embodiment, features of a receiver of a first device may measure or estimate an AoA of a signal transmitted by a second device. In an example implementation, the second device may transmit an encrypted packet according to BT version 4.2 (or earlier versions of the BT protocol), which does not include a pure tone signal. Based, at least in part, on a representation of data bits of the received packet (e.g., in a payload) and/or a characterization of anomalies of the receive packet, the first device may process the received signal to measure AoA.

FIG. 1 is a schematic diagram illustrating an example system that may include two or more devices configurable to implement techniques or processes described herein. System 100 may include, for example, a first device 104 and a second device 106, which may be operatively coupled together through a wireless communications network. In a particular implementation, as discussed below, first device 104 and second device 106 may exchange signals to measure or detect an AoA of a signal transmitted between first device 104 and second device 106. In an aspect, first device 104 or second device 106 may comprise any one of several different devices such as, for example, a mobile device or access point, for example. Also, in an aspect, first and second devices 104 and 106 may be included in a wireless communications network that may comprise one or more wireless access points, for example. However, claimed subject matter is not limited in scope in these respects.

First and second devices 104 and 106 may be representative of any device, appliance or machine that may be configurable to exchange data over a wireless communications network. By way of example but not limitation, any of first device 104 or second device 106 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof.

Similarly, a wireless communications network 110, as shown in FIG. 1, is representative of one or more communication links, processes, or resources configurable to support the exchange of data and measurements between at least first device 104 and second device 106. By way of example but not limitation, a wireless communications network may include wireless or wired communication links, telephone or telecommunications systems, data buses or channels, optical fibers, terrestrial or space vehicle resources, local area networks, personal area networks, wide area networks, intranets, the Internet, routers or switches, and the like, or any combination thereof. As illustrated, for example, by the dashed lined box illustrated as being partially obscured of second device 106, there may be additional like devices operatively coupled to wireless communications network 100.

It is recognized that all or part of the various devices and networks shown in FIG. 1, and the processes and methods as further described herein, may be implemented using or otherwise including hardware, firmware, software, or any combination thereof. Thus, by way of example but not limitation, first device 104 may include at least one processing unit 120 that is operatively coupled to a memory 122 through a bus 128.

Processing unit 120 is representative of one or more circuits configurable to perform at least a portion of a data computing procedure or process. By way of example but not limitation, processing unit 120 may include one or more processors, controllers, microprocessors, microcontrollers, application specific integrated circuits, digital signal processors, programmable logic devices, field programmable gate arrays, and the like, or any combination thereof.

Memory 122 is representative of any data storage mechanism. Memory 122 may include, for example, a primary memory 124 or a secondary memory 126. Primary memory 124 may include, for example, a random access memory, read only memory, etc. While illustrated in this example as being separate from processing unit 120, it should be understood that all or part of primary memory 124 may be provided within or otherwise co-located/coupled with processing unit 120. In a particular implementation, memory 122 and processing unit 120 may be configured to execute one or more aspects of process discussed herein in connection with FIG. 5.

Secondary memory 126 may include, for example, the same or similar type of memory as primary memory or one or more data storage devices or systems, such as, for example, a disk drive, an optical disc drive, a tape drive, a solid state memory drive, etc. In certain implementations, secondary memory 126 may be operatively receptive of, or otherwise configurable to couple to, a computer-readable medium 140. Computer-readable medium 140 may include, for example, any non-transitory medium that can carry or make accessible data, code or instructions for one or more of the devices in system 100. Computer-readable medium 140 may also be referred to as a storage medium.

For simplicity, FIG. 1 shows antenna 108 as comprising a single antenna element to received signals to be processed at a radio frequency receiver in communication interface 130. In particular implementations, antenna 108 may comprise multiple antenna elements to transmit and receive signals in a multiple-input multiple-output (MIMO) antenna architecture. Multiple antenna elements of antenna 108 may enable measuring an AoA of a signals transmitted by device 106. For example, portions of a signal transmitted by device 106 received at different ones of the multiple antenna elements of antenna 108 may be temporally and spatially correlated (e.g., at processing unit 120) to measure an AoA.

First device 104 may further comprise a clock 150 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 150 may comprise registers, oscillators, input terminals output terminals, etc. capable of providing values indicative of a clock state. In particular embodiments, a clock state maintained at clock 150 may be used to control processes to execute application functions on in a coordinated fashion on processing unit 120. As pointed out above, a clock state maintained at clock 150 may be synchronized with clock states maintained by devices other than first device 104 (e.g., second device 106).

First device 104 may include, for example, a communication interface 130 that provides for or otherwise supports the operative coupling of second device 106 to a wireless communications network at least through an antenna 108. By way of example but not limitation, communication interface 130 may include a network interface device or card, a modem, a router, a switch, a transceiver, and the like. In other alternative implementations, communication interface 130 may comprise a wired/LAN interface, wireless LAN interface (e.g., IEEE std. 802.11 wireless interface), Bluetooth® interface and/or a wide area network (WAN) air interface. It should be understood, however, that these are merely examples of air interfaces that may be employed for techniques described herein, and claimed subject matter is not limited in this respect. In a particular implementation, antenna 108 in combination with communication interface 130 may be used to implement processing of received signals as illustrated in FIGS. 2 through 5. In one implementation, communication interface 130 may comprise radio transceiver circuitry configurable to detect a phase of a wireless tone signal transmitted from second device 106 and received at antenna 108 (e.g., including multiple antenna elements as discussed herein). Such radio transceiver circuitry may also be configurable to transmit wireless tone signals at multiple different carrier frequencies.

First device 104 may include, for example, an input/output device 132. Input/output device 132 is representative of one or more devices or features that may be configurable to accept or otherwise introduce human or machine inputs, or one or more devices or features that may be configurable to deliver or otherwise provide for human or machine outputs. By way of example but not limitation, input/output device 132 may include an operatively configured display, speaker, keyboard, mouse, trackball, touch screen, data port, etc.

According to an embodiment, a transmitter (e.g., of first device 104 or second device 106) may modulate a transmitted wireless signal based, at least in part, on symbols (e.g., binary symbols as ones and zeros) using Gaussian frequency shift modulation (GFSM). In one example, a transmitter may transmit a packet signal by modulating a signal in a wireless communication medium based on a sequence of symbols making up specific fields containing parameters in a message. In an example implementation, modulating a signal transmitted in a wireless communication medium according to GFSM using a sequence of identical symbols (e.g., "111 . . . 1") over a duration may provide a "pure tone" signal over the duration comprising a signal approaching a sinusoid at a carrier frequency. Conversely, modulating a signal in the wireless communication medium according to GFSM using a heterogeneous sequence of symbols (e.g., a mixture of ones and zeros) may provide a signal that varies in frequency over a bandwidth of about 1.0 MHz.

Figure 2:
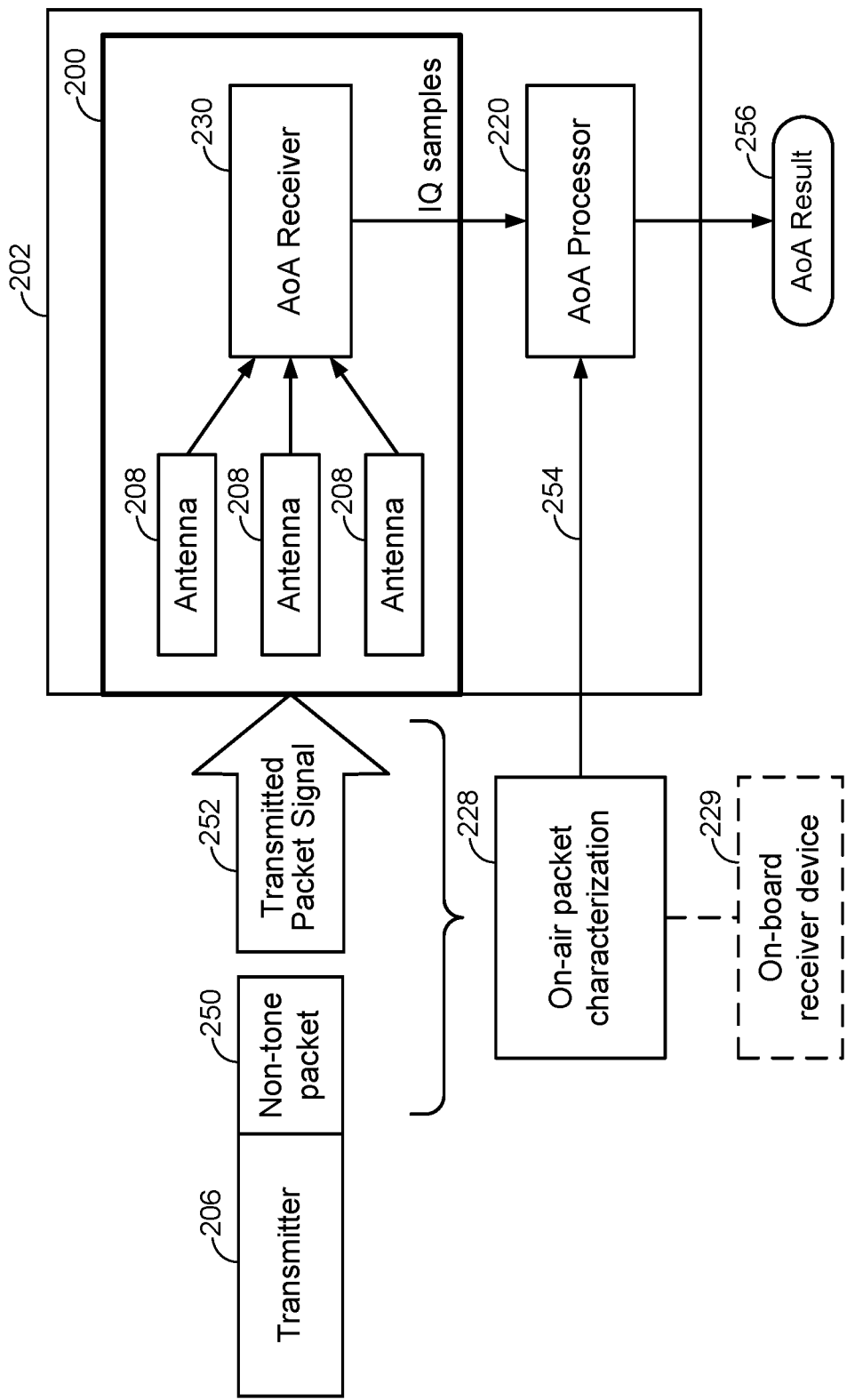
FIG. 2 is a schematic block diagram in accordance with an implementation of measuring an angle of arrival (AoA) of a signal received at a device.

FIG. 2 is a schematic block diagram in accordance with an implementation of measuring an angle of arrival (AoA) of a signal received at a device. As shown above, an AoA receiver 230 receives at a first receiving device 202 a non-tone packet signal 252 at multiple physical antennas 208 transmitted from a transmitter 206. In a particular implementation, transmitter 206 may not be capable of transmitting a packet signal as a pure tone signal. For example, transmitter 206 may comprise a BT transmitter transmitting signal packets using a particular format (e.g., according to BT version 4.2). According to an embodiment, a particular representation 254 of the non-tone packet signal 252 may be obtained based on a wireless signal transmitted from transmitter 206 other than the portion of non-tone packet signal 252 received at multiple physical antennas 208. In one implementation, the particular representation 254 may be obtained based, at least in part, on a portion of non-tone packet signal 252 received at an antenna (not shown) other than multiple antennas 208. In another implementation, the particular representation 254 may be obtained based, at least in part, on a prior or subsequent non-tone packet signal (not shown) received at multiple antennas 208 and having characteristics similar to characteristics of non-tone packet signal 252.

According to an embodiment, AoA processor 220 may obtain a measurement or estimate of an AoA of the received packet signal 252 based, at least in part, on the processed signal packet from the AoA receiver 230 and the particular representation 254 of the packet signal 254. As pointed out above, a pure tone signal may comprise a signal transmitted in a wireless transmission medium that approaches a pure sinusoid at a carrier frequency (e.g., a pure tone signal transmitted). Received packet signal 252, on the other hand, may comprise multiple frequency components from a GFSM modulation by a heterogeneous sequence of symbols (e.g., a sequence of one and zeros making up a preamble, fields in a header or payload, etc.) as implemented by BT version 4.2.

In a particular implementation, AoA processor 230 may temporally and spatially correlate signals received on individual antenna elements 208 to obtain a measurement of AoA. For example, AoA processor 230 may correlate particular representation 254 of packet signal with individual components of packet signal 252 received on individual antennae 208 to determine an estimate of AoA based, at least in part, on a difference in phase between individual components.

According to an embodiment, representation 254 of packet signal 252 may comprise any one of several indications of characteristics of packet signal 252. For example, representation 254 may comprise an estimated modulation index of packet signal 252, a frequency offset of packet signal 252 or a frequency drift across packet signal 252. In another example, representation 254 may comprise content as a sequence of symbols (e.g., in a payload portion of packet signal 252 where packet signal 252 is transmitted according to BT version 4.2 without additional features or enhancements).

According to an embodiment, correlating characteristics of representation 254 with individual components of packet signal 252 received on individual antenna elements 208, AoA processor 220 may provide an AoA measurement included in AoA result 256. According to an embodiment, representation 254 of packet signal 252 may be generated using any one of several means such as, for example, an optional on-board receiver device 229.

Figure 3A:
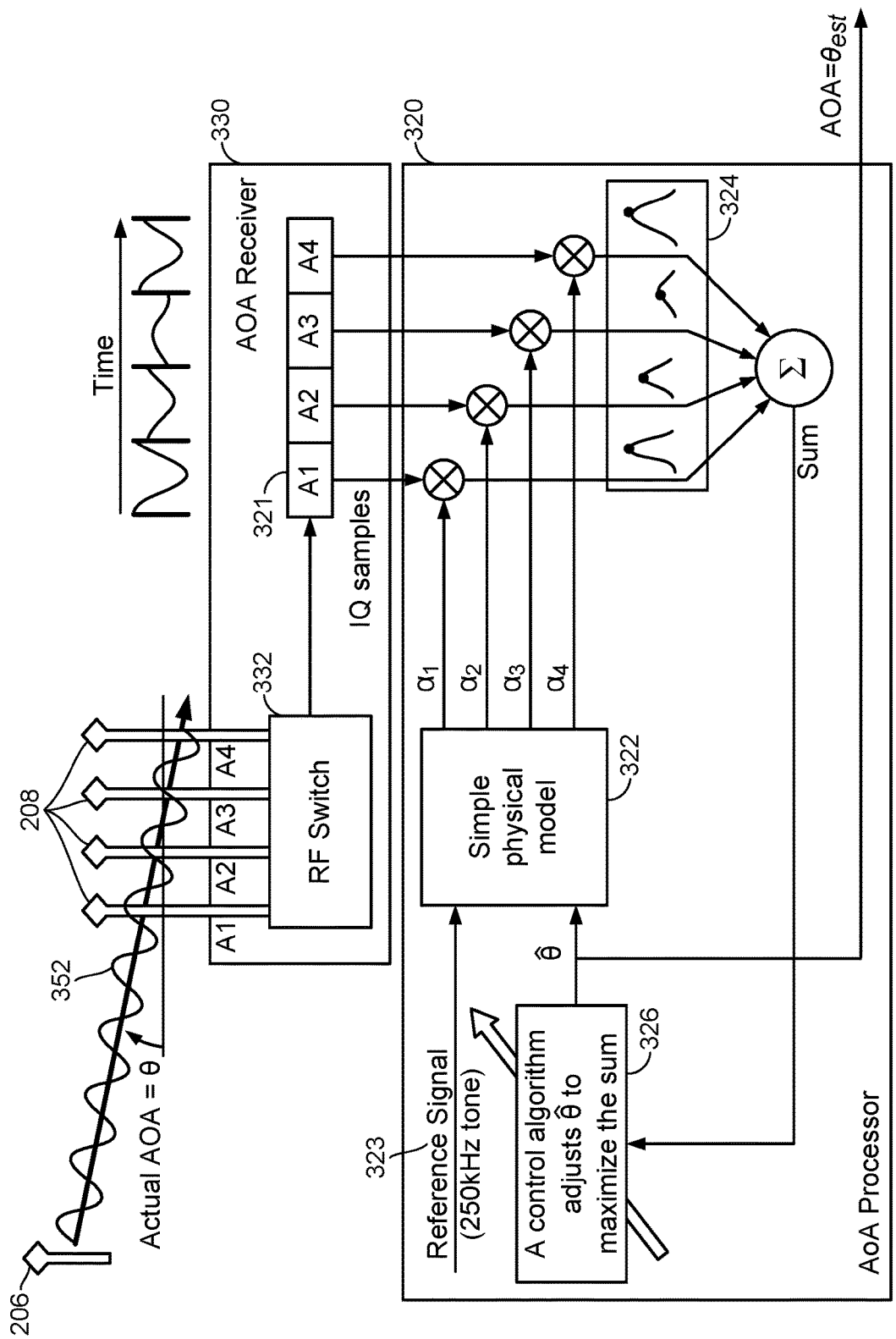
FIGS. 3A and 3B are schematic diagrams of aspects of a system to measure an AoA of a signal received at a device according to an embodiment.
Figure 3B:
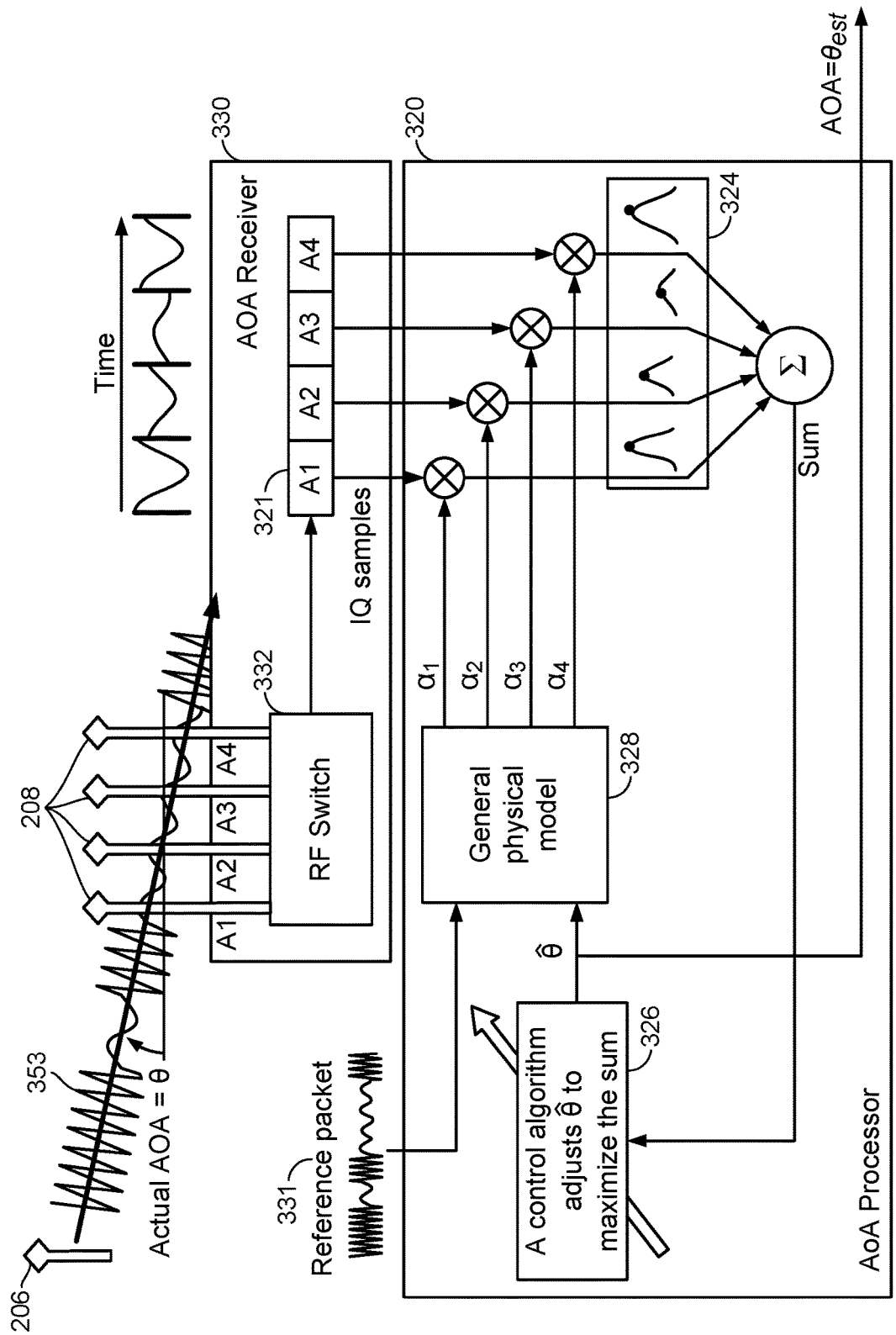

FIGS. 3A and 3B are schematic diagrams of aspects of a system to measure an AoA of a signal received at a device according to an embodiment. FIG. 3A illustrates an example of how AoA receiver 230 in combination with AoA processor 220 may operate to obtain a measurement of AoA of a pure tone signal in a particular implementation. The particular implementations of FIGS. 3A and 3B are shown as including four antennae 208. Another implementation may include other antenna two antennae, three antennae, or five or more antennae without deviating from claimed subject matter. As pointed out above, a transmitter may transmit a packet as a simple tone, which may be generated with polar modulators. For example, a transmitter may transmit a packet signal 352 by GFSK modulation of a wireless signal based on a continuous sequence of logical 1's or 0's (e.g., with whitening turned off). For example, a sequence of 1's may create a transmitted tone that is 250 kHz above a given RF carrier frequency (Fc) of a particular frequency channel. This is the same as an RF tone transmitted at a frequency of Fc+250 kHz. Here, packet signal 352 may have a duration of about 160 µs, for example.

Portions of packet signal 352 received at antennae 208 may be sampled at a switch 332 that interleaves connection of individual antennae 208 to a detection circuit for generating in-phase and quadrature (IQ) samples to be stored in a register 321. The AoA Processor compares the received baseband IQ samples with a physical model to determine the AoA. As may be observed, a phase of a received tone signal may be altered by different physical distances the tone signal travels based on its AoA (θ). Accordingly, estimates of AoA ($\theta_{est}$) may be determined based, at least in part, on detections of differences in phases of signals received on antennae 208 based on IQ samples stored in register 321. RF switch 332 may switch connections between different antennas 208 in a period such as 1.0 µs. If transmitter 206 and AoA receiver 330 remain stationary, then subsequent (later) samples from the same antenna, in theory, should be identical. With an imperfect transmitter, however, a frequency drift may be introduced across the packet, which can be detected and removed using the phase changes across multiple samples from the same antennas 208.

With a tone signal transmitted at about 250 kHz, a known phase shift of 90 degrees per microsecond occurs, which may be modelled as an aspect of the tone signal according to a physical model. This signal emulating aspects of a transmitted signal be referred to as a reference signal. AoA processor 320 may determine an estimate of the angle of arrival $\theta_{est}$ given IQ samples taken from multiple switched antennas 208. In a particular implementation, AoA processor 320 may incorporate principles of a Bartlett processor by determining $\theta_{est}$ by maximizing a sum of received signals from each antenna, scaled by complex factors $\alpha_n$ which are determined from a physical model controlled by a trial angle $\hat{\theta}$.

In an example physical model, it may be observed that antennas 208 are geometrically arranged with respect to an AoA axis. For example, three-dimensional positions of phase-centers of each antenna element may be modeled with respect to a center position. Alternatively, antennas 208 may be modelled or calibrated using gathered IQ samples, over azimuth, elevation, frequency and/or different polarizations. A calibration process may be performed with antennas 208 in an anechoic chamber or with antennas 208 attached in-situ.

According to an embodiment, a physical model may reconstruct a transmitted waveform as received by antennas 208 and RF switch 332. While the presently illustrated embodiment determines $\theta_{est}$ based on phase detections, other implementations may also evaluate magnitudes of signals received on antennas 208. For a given trial angle $\hat{\theta}$, a model may determine a set of complex factors $\alpha_n$ that represent complex conjugates of responses expected from antennas 208 for a received signal at the trail angle $\hat{\theta}$. Here, as trial angle $\hat{\theta}$ approaches true AoA θ, factors $\alpha_n$ may de-rotate incoming signals so that they align. Hence, as products are added, they may tend to add constructively in phase to the largest possible sum. If trial angle $\hat{\theta}$ deviates significantly from θ, then two or more of the incoming signals may not be adequately aligned and the resultant sum may not be a maximum. Hence, by including a control process 326 that adjusts trial angle $\hat{\theta}$ until a maximum signal is achieved, a reliable value for $\theta_{est}$ may be determined.

The particular example implementation of FIG. 3A is based on measuring an angle of arrival of a pure tone signal. As discussed above, in particular implementations a transmitter may not be configured to transmit a pure tone signal (e.g., a transmitter configured to transmit signals according to BT version 4.2 without additional features/enhancements). FIG. 3B shows a particular implementation in which an estimate of AoA $\theta_{est}$ is determined based on a packet signal that is not a pure tone signal. Here, signal 353 may comprise a packet comprising fields such as, for example, a header and a payload including a sequence of symbols (e.g., ones and zeros) that are not identical. Here, modulating signal 353 based on such a sequence of non-identical symbols using GFSK may produce a signal that is not a pure tone signal.

According to an embodiment, AoA process 320 may obtain reference signal 323 emulating one or more aspects of packet signal 353 as transmitted from transmitter 206. As discussed above, reference signal 323 may be obtained using any one of several techniques such as, for example, obtaining a representation or characterization of a signal packet that has been previously or subsequently transmitted by a transmitter, or by obtaining a representation or characterization based on a separately received portion of the signal packet. In one example, such a representation or characterization of a packet signal may comprise symbols used to modulate the packet signal (e.g., knowledge of transmitted on-air data bits) as obtained by decoding the symbols of a separately received signal or other a priori knowledge. Here, in one aspect, reference signal 323 may emulate one or more characteristics of packet signal 353 by being modulated by the same sequence of symbols modulating packet signal 353.

Being GFSK modulated by a sequence of non-identical symbols, packet signal 353 may vary in frequency between multiple frequencies (e.g., between two different frequencies for a sequence of ones and zeros). For example, the frequency of packet signal 353 may jump between Fc−250 kHz and Fc+250 kHz, where Fc is an ISM-band RF carrier frequency. This nominal variation between two different frequencies may be referred to as a modulation index (MI), which would be 0.5 MHz in the preceding example where the frequency of packet signal 353 jumps between Fc−250 kHz and Fc+250 kHz. In particular implementations of a transmitter, a modulation index may vary from 0.45 to 0.55 MHz. Which such variations in modulation index, integration of packet signal 353 over a duration of a packet may introduce significant phase changes that may be removed to enable a reliable measurement of phase (e.g., at RF switch 332). In particular implementations, a carrier frequency of packet signal 353 may not suddenly change between Fc−250 kHz and Fc+250 kHz as packet signal 353 may be smoothed by a Gaussian filter in the transmitter. Such a Gaussian filter may comprise a finite impulse response (FIR) filter having filter taps extending over a number of samples that may introduce inter-symbol-interference. This may further complicate detection of phase at RF switch 332 since a phase at any instant may be a function of a data symbol sequence, filter taps in a Gaussian filter, a modulation index and frequency drift.

According to an embodiment, reference packet 331 provided to AoA processor 320 may be constructed to match a signal packet that leaves an antenna at a transmitter. In a particular implementation, physical model 332 may incorporate features of reference packet 331, including phase changes over a duration of packet signal 353, to construct appropriate factors $\alpha_n$.

While the particular example implementations of FIGS. 3A and 3B may incorporate features of a Bartlett processor, other implementations may employ alternative beam-forming techniques such as, for example, the so-called Capon or MUSIC beam-forming techniques. These alternative beam-forming techniques may similarly construct a reference packet.

Figure 4:
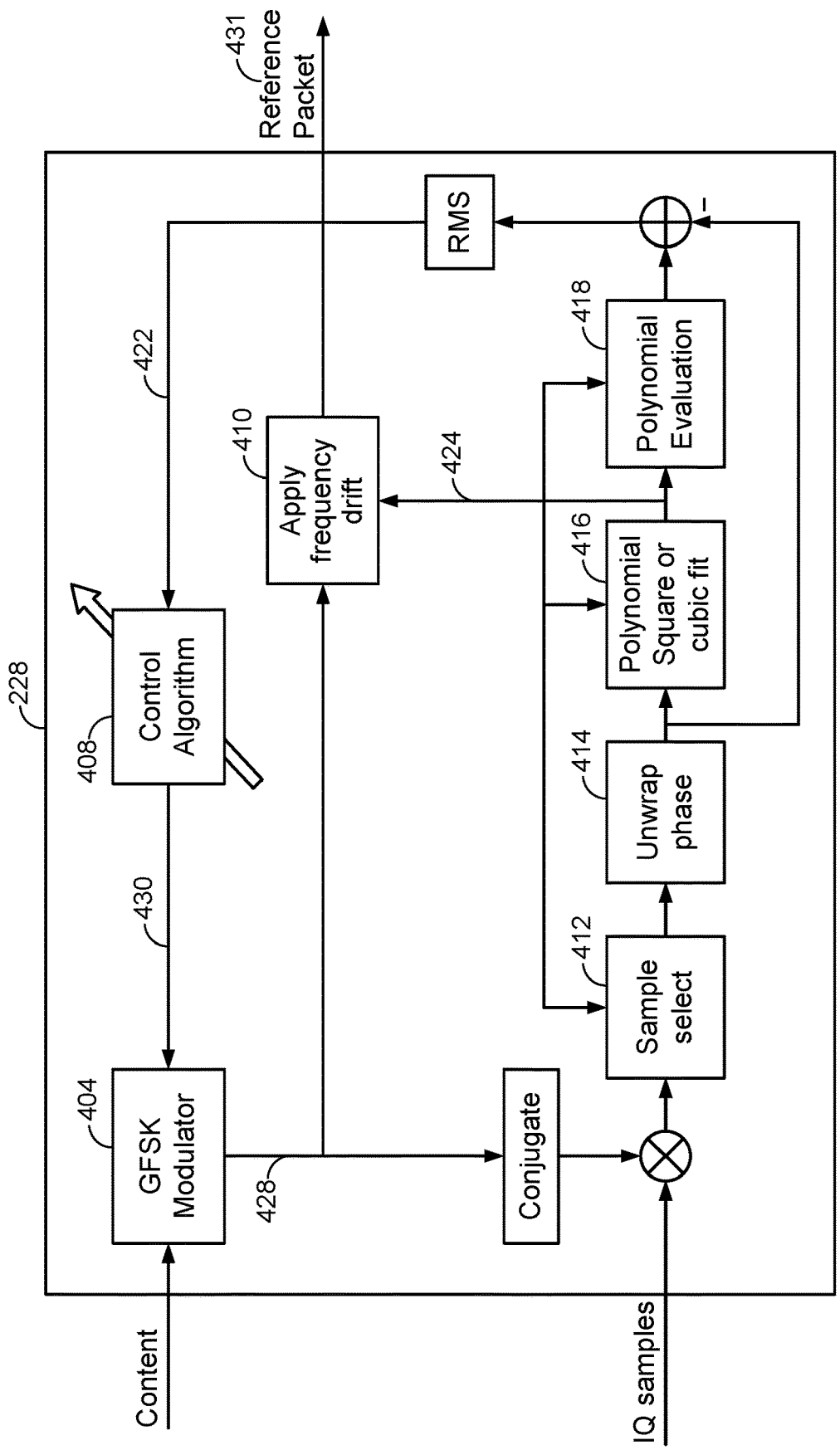
FIG. 4 is a schematic diagram of a system to obtain a characterization of a packet signal according to an embodiment.

FIG. 4 is a schematic diagram of a system to obtain a characterization of a wirelessly transmitted packet signal (e.g., representation 254, features of reference signal 323 or features of reference packet 331) according to an embodiment. It should be understood, that the features of FIG. 4 provide merely an example of how a particular characterization of a packet signal may be obtained, and that other systems with like or different features may be used without deviating from claimed subject matter. In the particular illustrated example implementation, a single receiver may be used to characterize a single packet signal. As such, corruption of a signal packet received at switched antennas (e.g., RF switch 332 applied to signals received at antennas 208) may prevent detection of data bits (e.g., in a payload). A reference packet 431 may be constructed where IQ samples of a received packet signal are gathered using a multiple-switched-antenna receiver as previously discussed, and data bits used to modulate at least a portion of the packet signal are determined in any one of a number of ways. In one example, a characterization of a packet signal may be determined, at least in part, on a different or separate packet. For example, content (e.g., data bits) of such a different or separate packet may be known at a receiver in advance (e.g., transmitted in a different communication channel). In one example, the different or separate packet may comprise an advertising packet that may be communicated in an advertising channel. Content in the advertising packet may be recovered or de-whitened based on characteristics of the particular advertising channel sending the advertising packet. In another example, the different or separate packet may comprise dedicated mode packet, where the content is known in advance and encryption has been disabled. Content in the dedicated mode packet may be recovered or de-whitened based, at least in part, on a Ble channel number.

Alternatively, the different or separate packet may comprise a dedicated mode packet, where the content is known in advance and encryption is applied. Here, local access to an encryption key may enable recovery or de-whitening of content.

As shown in FIG. 4, according to an embodiment, on-air packet characterization processor 228 may construct reference packet 431 based, at least in part, on content of a different or separate packet (e.g., on-air data bits) of the aforementioned different or separate packet and IQ samples obtained from receipt of the different or separate packet signal (e.g., on a multiple-antenna switched receiver). In an alternative implementation, the IQ samples may be determined from sampling received packet signal 353. As pointed out above, content of the different or separate packet may be obtained in advance. It should be understood, however, that these are merely examples of how content of a signal packet may be determined, and claimed subject matter is not limited in this respect.

According to an embodiment, on-air packet characterization processor 228 may construct reference packet 431 using known on-air data bits and switched IQ samples from a multiple-antenna switched receiver. IQ samples may be processed at blocks 412, 414 and 416 to determine a frequency drift 424. Control algorithm 408 may initially use a particular default modulation index (MI) such as 0.5 MHz to be provided to GFSK modulator 404. Control algorithm 408 may adjust the value of the MI to minimize a polynomial fitting error 422. Once polynomial fitting error is sufficiently small, a phase due to content (e.g., data bits) may be largely removed and residual phase may be due mainly to the transmitter's frequency drift. A polynomial shape determined at block 416 may then characterize a residual phase drift across the packet due to the transmitter.

GFSK modulator 404 may generate an initial reference packet 428 based on content of the second or different packet and an estimated MI 430. Block 410 may adjust initial reference packet 428 based on estimated frequency drift 424 to generate reference packet 431. A conjugate of initial reference packet 428 may be obtained so that the phase will largely be the opposite of the received IQ samples. By multiplying the two signals together the effects of the data bits are mostly removed (assuming the estimated MI is sufficiently accurate). In this case, a resultant signal may contain phase differences arising from different antenna positions and AoA, and a phase drift arising from the transmitter's frequency drift.

According to an embodiment, a partial packet may be constructed from samples of a single antenna only, so that phase changes due to relative antenna positions are ignored. An unwrapped phase signal of a partial packet may be constructed at block 414. The phase of the partial packet may vary slowly over the partial packet as compared with changes in phase of data bits which have largely been removed. As such, the partial packet may be modelled by a polynomial (e.g., a square, cubic or other higher order polynomial) at block 416 using regression techniques. Block 418 may then evaluate the partial packet modeled by the cubic or square polynomial to determine an error.

Figure 5:
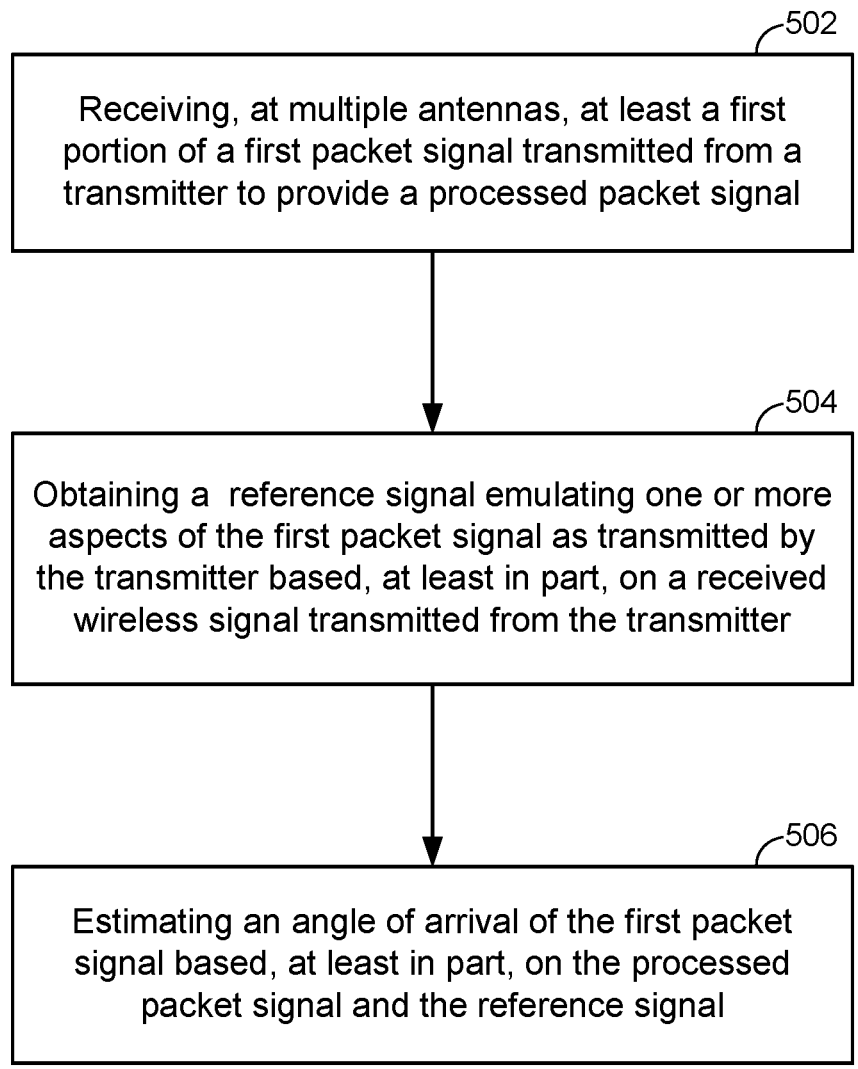
FIG. 5 is a flow diagram of a process to measure an AoA of a received signal according to a particular embodiment.

FIG. 5 is a flow diagram of a process to be performed at a first device (e.g., first device 104 or receiving device 202) to obtain an estimate of an AoA of a signal transmitted by a second device according to an embodiment. Block 502 comprises receiving, at multiple antennas (e.g., multiple antennas 208), at least a first portion of a first packet signal transmitted from a transmitter to provide a processed packet signal. In this context, a "packet signal" as referred to herein means a signal in a physical transmission medium (e.g., a wireless transmission medium) that is modulated one or more symbols (e.g., ones and zeros) to convey content (data or information, etc.) in a particular packet format. In an example implementation, such a packet format may define a header portion and a payload portion carrying a message. Also, a signal packet may be transmitted in a particular BT format such as a BT format defined in BT version 4.2 without additional enhancements. Here, it may be recognized that in another example implementation, that such a signal packet may not comprise a data portion that is transmitted as a single "tone" as having a portion modulated by a sequence of identical symbols (e.g., "1111 . . . 1").

Block 504 comprises obtaining a reference signal emulating one or more aspects of the first packet signal (received at block 502) as transmitted from a transmitter. For example, the reference signal may emulate one or more aspects of the first packet signal as transmitted from an antenna at a transmitter in an air interface, but prior to being processed at a receiver. Such a reference signal may be based, at least in part, on a wireless signal transmitted from the transmitter other than the first portion of the first packet signal. In this context, a "characterization" of a portion of packet signal as referred to herein means an indication of at least one attribute of the packet signal. Further in this context, an emulation of one or more aspects of a wireless signal, by a reference signal for example, as referred to herein means including one or more attributes of the wireless signal. In one implementation, a reference signal may emulate an aspect of a signal packet by being modulated by specific symbols that are/were used to modulate the signal packet for transmission in a medium such as, for example, a parameters, data, etc. in a payload portion of the signal packet. In another implementation, a reference signal may emulate an aspect of a signal packet by embodying particular physical signal characteristics of the signal packet such as, for example, a modulation index, frequency offset (e.g., with respect to a particular known carrier frequency) or frequency drift across the signal packet, just to provide a few examples as described above. It should be understood, however, that these are merely examples of attributes or features of a packet signal that may be emulated by a reference signal, and that claimed subject matter is not limited in this respect.

According to an embodiment, block 504 may obtain a characterization of a received first portion of the packet signal from a wireless signal other than the received portion of the packet signal using any one of several techniques. In one implementation, a separate antenna (e.g., other than the multiple antennas used to receive the first portion at block 502) may receive a second portion of the packet signal. The second portion of the packet signal may be processed to obtain a characterization of the packet signal including, for example, a data portion of a payload in the packet signal, modulation index, frequency offset or frequency drift. This characterization may then be used to construct a reference signal emulating one or more aspects of a packet signal as illustrated in FIG. 4.

In another embodiment, a characterization of a first packet signal may be obtained at block 504 based, at least in part, on a second packet signal transmitted before or after the first packet signal. Here, the second packet signal may comprise a sequence of symbols in a payload portion that is identical to a sequence of symbols of a payload portion of the first packet signal. The second packet signal may be processed (e.g., at AoA receiver 230) to obtain characteristics of the first packet signal. In one implementation, a transmitter may transmit an initial packet signal including a parameter (e.g., a value or bit in a field or a header) indicating that a subsequent packet signal is to have a sequence of symbols in a payload portion that is identical to a sequence of symbols in a payload portion of the initial packet signal.

Block 506 may obtain an estimate of an AoA of the first packet signal based, at least in part, on the processed packet signal obtained at block 502 and the characterization of the packet signal obtained at block 504.

Subject matter shown in FIG. 1 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device," "mobile device," "receiving device" and/or similar terms; however, if it is determined, for some—23 reason not immediately apparent, that the foregoing understanding cannot stand and that 35 USC § 112(f) therefore, necessarily is implicated by the use of the term "computing device," "wireless station," "wireless transceiver device," "mobile device," "receiving device" and/or similar terms, then, it is intended, pursuant to that statutory section, that corresponding structure, material and/or acts for performing one or more functions be understood and be interpreted to be described at least in FIG. 5 and corresponding text of the present disclosure.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, remote control, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a receiving device, comprising:
   receiving, at multiple antennas, at least a first portion of a first packet signal transmitted from a transmitter on a first communication channel to provide a processed packet signal;
   obtaining a reference signal emulating one or more aspects of the first packet signal as transmitted by the transmitter based, at least in part, on a received wireless signal transmitted from the transmitter on a second communication channel different than the first communication channel; and
   estimating an angle of arrival of the first packet signal based, at least in part, on the processed packet signal and the reference signal.

2. The method of claim 1, wherein the reference signal comprises a data sequence in a payload portion of the first packet signal.

3. The method of claim 2, wherein the received wireless signal transmitted from the transmitter comprises a second packet signal comprising a payload portion comprising the data sequence.

4. The method of claim 1, wherein the received wireless signal transmitted from the transmitter other than the at least a first portion of the first signal received at the multiple antennas comprises a second portion of the first packet signal received at a second receiving device.

5. The method of claim 1, wherein the first packet signal is transmitted in a format in accordance with Bluetooth version 4.2, December 2014.

6. The method of claim 1, wherein obtaining the reference signal further comprises:
estimating a modulation index of the first packet signal;
estimating a frequency offset of the first packet signal; and
estimating a frequency drift across the first packet signal.

7. The method of claim 1, wherein estimating the angle of arrival of the first packet signal further comprises:
correlating features of the reference signal with the first portion of the first packet signal received on the multiple antennas.

8. The method of claim 1, wherein the second communication channel is an advertising channel, and wherein the reference signal comprises an advertising packet.

9. A receiving device, comprising:
a plurality of antennas; and
a processor configured to:
process at least a first portion of a first packet signal received at the plurality of antennas and transmitted from a transmitter on a first communication channel to provide a processed packet signal;
obtain a reference signal emulating one or more aspects of the first packet signal as transmitted by the transmitter based, at least in part, on a received wireless signal transmitted from the transmitter on a second communication channel different than the first communication channel; and
estimate an angle of arrival of the first packet signal based, at least in part, on the processed packet signal and the reference signal.

10. The receiving device of claim 9, wherein the reference signal comprises a data sequence in a payload portion of the first packet signal.

11. The receiving device of claim 10, wherein the received wireless signal transmitted from the transmitter comprises a second packet signal comprising a payload portion comprising the data sequence.

12. The receiving device of claim 9, wherein the received wireless signal transmitted from the transmitter other than the at least a first portion of the first signal received at the multiple antennas comprises a second portion of the first packet signal received at a second receiving device.

13. The receiving device method of claim 9, wherein the first packet signal is transmitted in a format in accordance with Bluetooth version 4.2, December 2014.

14. The receiving device of claim 9, wherein the one or more aspects comprise an estimated modulation index of the first packet signal, an estimated frequency offset of the first packet signal or an estimated frequency drift across the first packet signal, or a combination thereof.

15. The receiving device of claim 9, wherein the processor is further configured to estimate the angle of arrival of the first packet signal based, at least in part, on a correlation of features of the reference signal with the first portion of the first packet signal received on the multiple antennas.

16. A storage medium comprising computer-readable instructions stored thereon which are executable by one or more processors at a receiving device to:
obtain at least a first portion of a first packet signal received at multiple antennas, at least a first portion of the first packet signal transmitted from a transmitter on a first communication channel, to provide a processed packet signal;
obtain a reference signal emulating one or more aspects of the first packet signal as transmitted by the transmitter based, at least in part, on a received wireless signal transmitted from the transmitter on a second communication channel different than the first communication channel; and
estimate an angle of arrival of the first packet signal based, at least in part on the processed packet signal and the reference signal.

17. The storage medium of claim 16, wherein the reference signal comprises a data sequence in a payload portion of the first packet signal.

18. The storage medium of claim 17, wherein the received wireless signal transmitted from the transmitter comprises a second packet signal comprising a payload portion comprising the data sequence.

19. The storage medium of claim 16, wherein the received wireless signal transmitted from the transmitter other than the at least a first portion of the first signal received at the multiple antennas comprises a second portion of the first packet signal received at a second receiving device.

20. The storage medium of claim 16, wherein the one or more aspects comprise an estimated modulation index of the first packet signal, an estimated frequency offset of the first packet signal or an estimated frequency drift across the first packet signal, or a combination thereof.

21. The storage medium of claim 16, wherein the instructions are further executable by the one or more processors to estimate the angle of arrival of the first packet signal based, at least in part, on a correlation of features of the reference signal with the first portion of the first packet signal received on the multiple antennas.

22. A receiving device, comprising:
means for receiving, at multiple antennas, at least a first portion of a first packet signal transmitted from a transmitter on a first communication channel to provide a processed packet signal;
means for obtaining a reference signal emulating one or more aspects of the first packet signal as transmitted by the transmitter based, at least in part, on a received wireless signal transmitted from the transmitter on a second communication channel different than the first communication channel; and
means for estimating an angle of arrival of the first packet signal based, at least in part, on the processed packet signal and the reference signal.

23. The receiving device of claim 22, wherein the reference signal comprises a data sequence in a payload portion of the first packet signal.

24. The receiving device of claim 23, wherein the received wireless signal transmitted from the transmitter comprises a second packet signal comprising a payload portion comprising the data sequence.

25. The receiving device of claim 22, wherein the received wireless signal transmitted from the transmitter other than the at least a first portion of the first signal received at the multiple antennas comprises a second portion of the first packet signal received at a second receiving device.

26. The receiving device of claim 22, wherein the means for obtaining the reference signal further comprises:
- means for estimating a modulation index of the first packet signal;
- means for estimating a frequency offset of the first packet signal; and
- means for estimating a frequency drift across the first packet signal.

27. The receiving device of claim 22, wherein the means for estimating the angle of arrival of the first packet signal further comprises:
- means for correlating features of the reference signal with the first portion of the first packet signal received on the multiple antennas.

* * * * *